Oct. 9, 1973  H. F. STERLING  3,764,272
APPARATUS FOR PRODUCING FINE POWDER BY PLASMA SUBLIMATION
Filed March 17, 1971  3 Sheets-Sheet 1

Inventor
HENLEY F. STERLING
By Stephen A. Young
Attorney

Oct. 9, 1973  H. F. STERLING  3,764,272
APPARATUS FOR PRODUCING FINE POWDER BY PLASMA SUBLIMATION
Filed March 17, 1971  3 Sheets-Sheet 2

Inventor
HENLEY F. STERLING
By Stephen A. Young
Attorney

Oct. 9, 1973     H. F. STERLING     3,764,272
APPARATUS FOR PRODUCING FINE POWDER BY PLASMA SUBLIMATION
Filed March 17, 1971     3 Sheets-Sheet 3
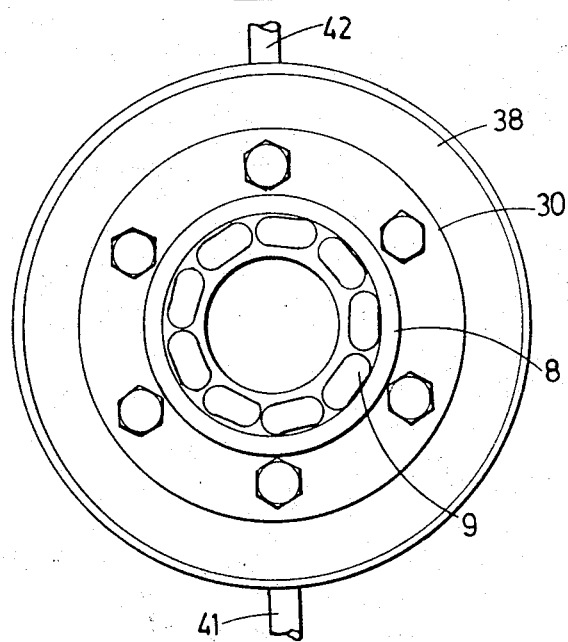
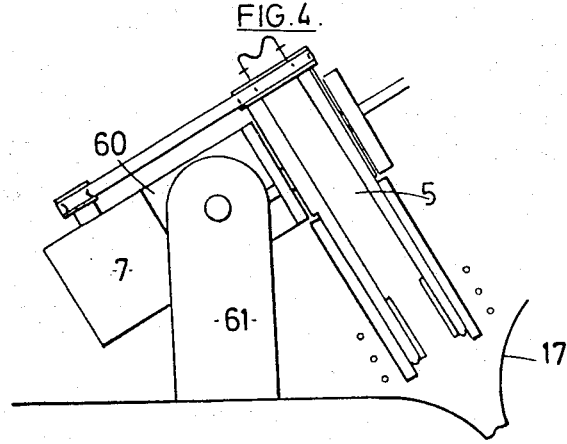
Inventor
HENLEY F. STERLING United States Patent Office 3,764,272
Patented Oct. 9, 1973

3,764,272
APPARATUS FOR PRODUCING FINE POWDER BY PLASMA SUBLIMATION
Henley Frank Sterling, Hunsdon, England, assignor to ITT Industries, Inc., New York, N.Y.
Filed Mar. 17, 1971, Ser. No. 125,095
Claims priority, application Great Britain, Mar. 24, 1970, 14,107/70
Int. Cl. B01d 7/00
U.S. Cl. 23—273 SP                                 7 Claims

ABSTRACT OF THE DISCLOSURE

A fine powder is produced by vaporizing a material containing the constituent elements thereof in a plasma energized at a medium or radio frequency, said material being contained within a rotating cluster of internally fluid cooled spaced tubes of metal of high electrical and thermal conductivity, and condensing the vaporized material.

---

This invention relates to the production of fine powder, and particularly, but not exclusively, to the production of fine silica powder.

It is well known that sub-micron sized silica dust may be produced by the condensation of vaporized silica or by the reoxidation of silicon monoxide vapor produced by the reaction of sand and coke, that is silica and carbon. The formative reactions are $SiO_2+C=SiO+CO$, then $SiO+CO+O_2=SiO_2+CO_2$.

In order to effect these reactions efficiently and economically, it is usual to employ some form of electrothermal heating rather than a chemical flame. The electrothermal heating can take the form of a plasma torch or an electrically augmented flame. Arc electrodes may also be used.

For containing and providing the heated reaction zone it is known to rotate a high temperature furnace and so provide a stable wall of liquid refractory by centrifugal force, inside a ceramic tube for example.

According to one aspect of the invention there is provided a method of producing material in fine powder form which includes the steps of vaporizing the material or a substance containing the material or the constituent elements thereof in a plasma energized at a medium frequency or a radio frequency and contained within a rotating cluster of internally fluid cooled spaced tubes of metal of high electrical and thermal conductivity, and condensing the vaporized material.

According to another aspect of the invention there is provided apparatus for the production of material in fine powder form comprising a cluster of spaced tubes of metal of high electrical and thermal conductivity, means for rotating said cluster, means for passing a cooling fluid through said tubes, means including an induction coil surrounding a portion of said cluster for energizing a medium frequency or radio frequency plasma within said cluster, means for feeding the material or a substance containing the material or the constituent elements thereof into the plasma containing portion of said cluster, means for condensing the vaporized material, and means for collecting the condensed material.

For the purpose of this specification a metal of high electrical and thermal conductivity is defined as a metal having a thermal conductivity of not less than 0.49 gram calories per sec. per cm.$^2$ per ° C. per cm. and a specific electrical resistance of not more than $2.665\times10^{-6}$ ohms per cm.$^2$ at 0° C. Silver, gold and copper are suitable metals. Alloys of these metals may be employed, or a surface coating of one metal on another metal.

Medium frequency is defined as a frequency lying within the range 1 to 10 kHz. Radio frequency is defined as a frequency exceeding 10 kHz.

Figure 1:
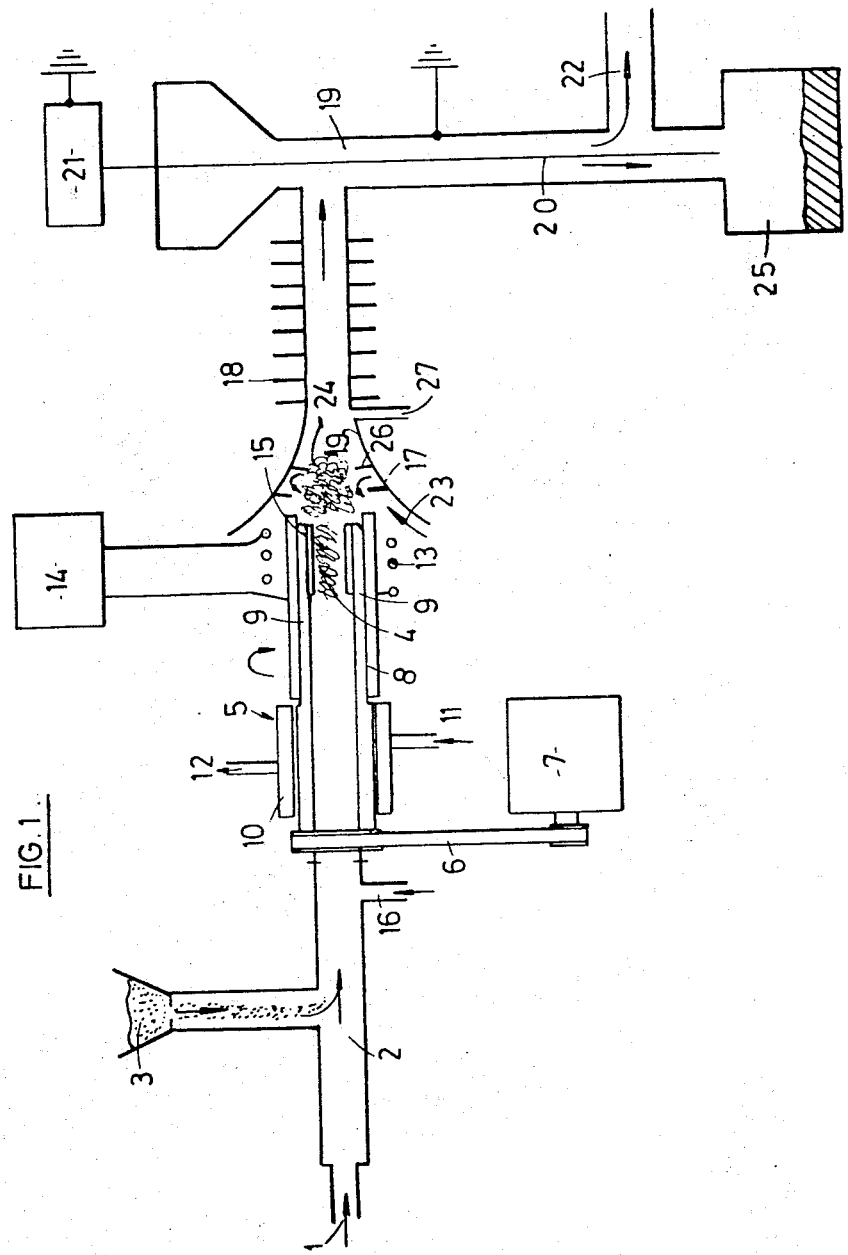
Figure 2:
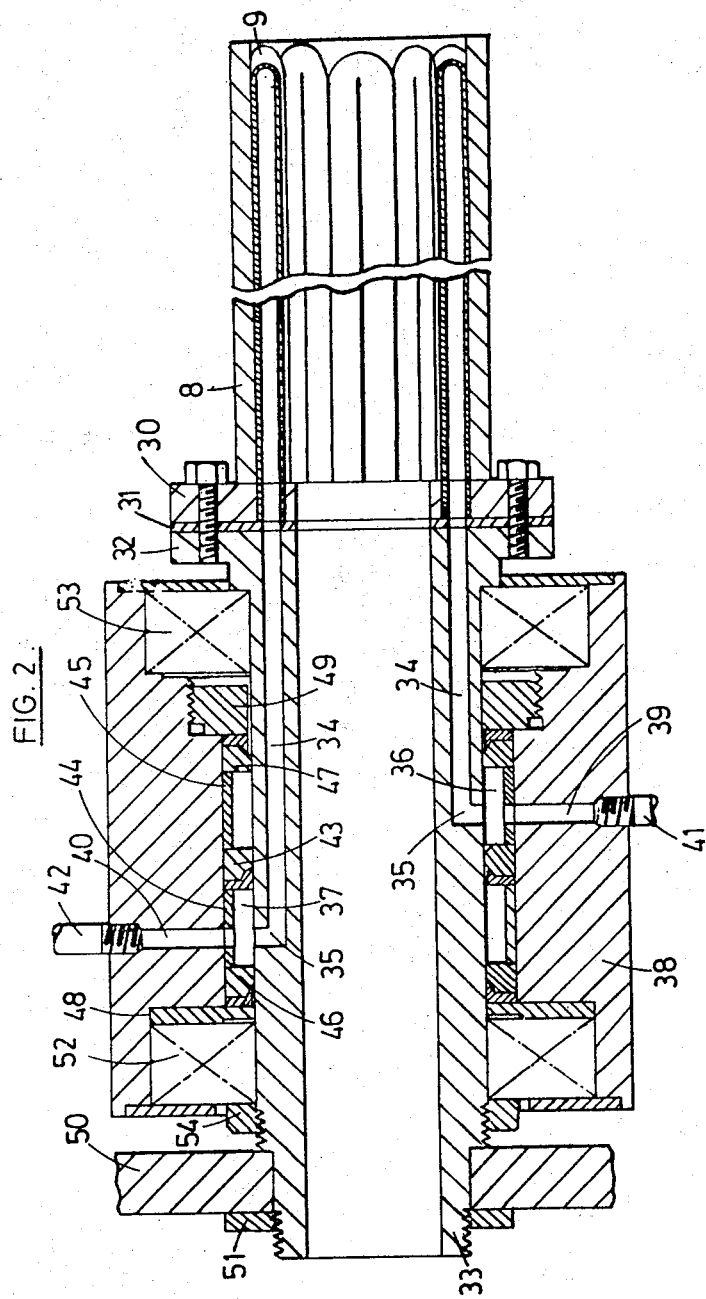

A preferred embodiment of the invention will now be described with reference to the accompanying drawings, in which:

FIG. 1 is a schematic view of equipment for producing material in fine powder form, FIGS. 2 and 3 are a sectioned side view and an end view respectively of the furnace of the equipment, and FIG. 4 shows an alternative operating position for the furnace of the equipment.

Referring to FIG. 1, air, acting as a carrier gas, flows through a primary gas inlet 1 to entrain a mixture of coarse (>100μ) silica powder and carbon powder fed into an entrainment chamber 2 from a hopper 3.

The gas entrained mixture is delivered from the chamber 2 into a plasma flame 4 established within a furnace 5, rotated about its longitudinal axis in the range 100–1000 r.p.m. by a belt drive 6 from a variable speed electric motor 7, and comprising a tube 8 of dielectric material, e.g. silica, surrounding a double open-ended cluster of closely spaced tubes 9 of metal of high electrical and thermal conductivity which extend from a manifold arrangement 10 and which are water cooled as indicated by arrows 11 and 12. Surrounding the outlet end of the furnace is a primary induction coil 13, of a multi-turn water cooled copper tube connected to and powered by a medium frequency or radio frequency generator 14. Fuller details of the furnace 5 will be described later with reference to FIGS. 2 and 3.

With the primary induction coil 13 energized by the generator 14, power is induced through the space between the metal tubes 9 and also by induction due to the current which flows circumferentially in each metal tube 9. Since the tubes 9 must not touch each other the surrounding silica tube 8 serves to contain the gas flowing through the furnace.

Prior to starting up the process, there is placed within the cluster of metal tubes 9 of the furnace in the region of the plasma, i.e. within the length encompassed by the induction coil 13, a silica ring 15 i.e. of the same material as that to be produced in powder form. Then the furnace is set into rotation, and with the coil 13 energized, the gas plasma is initiated in argon flowing through the furnace provided from tube 16, and the gas flow is then changed over to the air entrained silica-carbon powder.

The tubes 9 surround and serve to support the silica ring 15 and chill it so that it does not collapse at the high temperatures which result from power from the primary coil 13 being transferred via the metal tubes 9 to the gas plasma 4 inside the silica ring 15.

This overcomes one of the main difficulties of the containment of a gas plasma in a refractory tube at high temperatures. On rotation, the hot and plastic or semi-liquid silica ring 15 is held against the cage of metal tubes 9 and a liquid charge may be contained and held by centrifugal force in the plasma zone. As evaporation proceeds this zone is then replenished with new material.

By feeding silica powder and carbon powder into the plasma zone 4 surrounded by the silica ring 15 (in practice the silica powder added melts and forms its own ring), SiO is produced in the first stage of producing fine silica powder, by the reaction $SiO_2+C=SiO+CO$.

As soon as this reaction has occurred oxygen must be supplied to oxidise fully the subspecies SiO and CO and to act as a quenching gas.

It is economic to flow some air through the hot zone as it is the cheapest plasma gas but this is kept to a minimum to save heat loss. Depending on the type of feed system used and the form of the carbon a very small portion of this carbon is oxidised prematurely by this air flow but most of it is wetted and covered by liquid silica in which it reacts. An oxidising atmosphere is known to assist this reaction anyway. It is important to feed the carbon in such a form as not to burn in this air prematurely (to an oxide of carbon).

The furnace 5 communicates at its outlet end with a bell-mouth ended tube 17 which has cooling fins 18 and which is connected to an electrostatic precipitator 19 having an electrode 20 connected to a high voltage DC supply 21. There is a suction exhaust 22 which, with the furnace powered and rotating and air entrained silica and carbon powder being fed into the input end of the furnace 5, causes flow through the furnace 5 of the carrier gas with the silica and carbon through the reaction zone within the silica ring 15 and also causes atmospheric air (secondary air) to be drawn in at the bell-mouth end of the tube 17, as indicated by arrows 23 to oxidise the $SiO+CO$ to $SiO_2+CO_2$ at chemical oxidation zone 24. The resulting carrier gas entrained $SiO_2$ passes along the length of the tube 17 provided with the cooling fins 18, and thence to the electro-static precipitator 19. The silica, in powder size $<2000$ A., is collected in a hopper 25 and gaseous products pass to the exhaust 22.

In the precipitator stage where sub-micron silica powder is formed, good process control is necessary in order to change the nature of the surface of the particles for different applications. It has been found desirable to design a precipitation zone at the point where the hot gaseous silicon monoxide vapour is oxidised to silica. In this zone, which can be termed the precipitation chamber, means are provided for heating or cooling the secondary air and for modifying the gas flow so that the dwell time for silica nuclei is controlled. For some applications the sub-micron powder should be formed so that the gas mixture gives the same source conditions for each silica particle and there is a very small range of particle sizes. One method for achieving this is to promote maximum turbulence in the gas by arranging vanes 26 associated with this chamber which promote the secondary air to enter spirally in counter-rotation to that of the rotating furnace and its plasma-gas feed.

Means indicated by a tube 27 are also provided in this precipitation chamber for the injection of water vapour of other OH-group producing species so that siloxane and silanol groups are attached to silicon dioxide molecular structure. These OH-group producing materials may also or alternatively be added with the primary air.

As an alternative to a coarse powder feed, it is very satisfactory to mix the silica in the form of a dough. The addition agent should contain carbon and may also contain hydrogen alone or with oxygen. For example crude oil may be used. Silica powder is mixed with a sufficient quantity of oil to form a dough so that a "toothpaste" like material is formed which is then squeezed under pressure into the heated reaction zone. The decomposition of the oil then provides the necessary carbon to reduce the silica for the production of silicon monoxide. The further steps of oxidation to $SiO_2$ then quenching and collecting the $SiO_2$ take place subsequently. The consistency of the paste may be altered to suit the extrusion process or feed into the reaction zone, e.g. thickened by the addition of a thickening agent such as sawdust which will contribute some carbon. It is also possible to use cellulose derivatives other than sawdust for example methyl cellulose solution in water for thickening the paste.

It has been found that under some conditions, especially when sand and carbon are added to the reaction zone in powder form, that the carbon burns away in the air plasma before it has time to become part of the "liquid silica wall" (where it reacts only with the silica surrounding it). To prevent this effect it has been found desirable to prepare the feed stock in the form of rods or pellets, either plastic or solid and dry by the above mentioned technique of mixing addition agents such as methyl cellulose solution in water. When such granules, for example, are fed into the reaction zone through the plasma their surface silica immediately fuses and protects the carbon during its momentary passage through the oxidising plasma to form part of the liquid wall.

Referring now to FIGS. 2 and 3, the circular cluster of metal tubes 9 of the furnace is formed by U- or hairpin-shaped copper tubes, with their bent ends terminating at the outlet end of the furnace and their other ends each terminating open-ended in a corresponding one of a radial series of bores through an annular adaptor plate 30 which supports the copper tubes. The tubular cluster together with the surrounding silica tube 8 which is fastened at the adaptor plate end by a sealing tape (not shown) at the chilled end of the cluster, constitute the plasma and atmosphere containing portion of the furnace.

The adaptor plate is bolted, with an intermediate sealing washer 31, to the face of a flange 32 of a hollow cylinder rotor manifold 33 which has longitudinal bores 34 extending from the flange face on a pitch circle diameter equal to the pitch circle diameter of the cluster as terminated in the adaptor plate.

Each of the longitudinal bores terminates via a radial 35 bore in one or other of two annular chambers 36 and 37 formed between the outer periphery of the rotor and the inner periphery of a hollow cylinder stator manifold 38.

One chamber, 36, is for inlet cooling water and the other chamber, 31, for outlet cooling water. Thus in order to circulate the cooling water through the tubes of the cluster, one end of each bent tube of the cluster connects with a longitudinal bore 34 leading to the inlet chamber, while the other end of the same tube connects with the adjacent longitudinal bore which in turn leads into the outlet chamber, and so on for the whole cluster. The stator cylinder contains two radial bores 39 and 40 communicating with the inlet chamber 36 and the outlet chamber 37 respectively, with pipes 41 and 42 for external connection to a water supply and drain.

The two chambers are sealed from one another by an annular seal 43 between spacer rings 44 and 45, and there are annular end seals 46 and 47 bearing against a backing ring 48 and a clamping ring 49 respectively.

The rotor cylinder has a belt drive pulley 50 fastened thereto by a clamping ring 51 and is rotated within the stator about bearing assemblies 52 and 53, a clamping ring 54 abutting the bearing assembly 52.

As shown the tubes of the cluster extend parallel to one another. Different shaped clusters, with different bore diameters but with the tubes terminating in an adaptor plate on the same pitch circle diameter as that of the manifold, may be readily attached to the manifold.

In an example of one method of operation of the furnace for the production of silica powder the following steps were taken.

Using a rotating furnace as hereinbefore described and having an internal diameter for the copper tube cage of 2 inches, a short snug fitting silica tube was inserted internally to provide a starting surface. Ten grams of silica and carbon granules mixed in the proportion 80% silica 20% carbon by weight were introduced into the furnace on to the short tube, the furnace already rotating at 400 r.p.m. about a horizontal axis. Convenient mesh sizes for the constituents are silica 40 mesh and carbon 40 mesh. Argon gas was admitted into the rear of the furnace through a tangentially inserted pipe at a rate of 5 litres per minute and the coil surrounding the furnace was energised with radio frequency current at a frequency of 3 mHz. and at a power level of 15 kt. A carbon striker rod was inserted into the front end of the furnace to initiate the plasma flame and withdrawn on striking.

The power levels were then adjusted to balance and electrically match the plasma flame to the generator. The earthing arrangements and field pattern between the copper cage and coil were also adjusted to prevent the flashover of secondary arcs. The flow of argon was then replaced by that of air using suitable flowmeters and gas valves so that an air plasma was established at a flow of 7 litres per minute. Carbon silica mixture was then entrained in the air plasma and was so directed that it replenished the centrifugally maintained wall of mixed viscous liquid silica and solid carbon particles. The power level of the generator was adjusted to maintain a temperature in the plasma zone in the 3000–4000° C. region, and the products of the reaction escaped from the furnace. A flow of cold secondary air of 20 litres per minute was arranged to meet these escaping gases (SiO and CO) and suck them via the precipitation chamber to the collection system. On mixing and cooling, silica smoke and carbon dioxide were produced and were carried through the electrostatic precipitator system so that the silica smoke was agglomerated and collected.

As already stated the metal tubes forming the plasma containing cluster must not touch one another, as their function, in addition to containment, is to permit power transfer into the cluster for maintaining the plasma.

If the tubes are reasonably closely spaced to one another it is possible to dispense with the encircling dielectric tube, and the process has been successfully carried out with such a closely spaced tube cluster with no surrounding dielectric tube.

An increase of the spacing between the tubes is permissible, to an extent dictated only by the necessity for defining an adequate container for the internal ring of material in its plastic or semi-liquid state, and which may occupy the space between the tubes. With any significant spacing between the tubes, the encircling dielectric tube will normally be required to contain the gaseous atmosphere.

The operation of the furnace and its immediate ancillary equipment is not limited to horizontal operation.

For some conditions of operation it has been found advantageous to operate the rotating furnace in a vertical position or at such angle to the vertical that feed material is encouraged to alight or arrive at the wall surface assisted by gravity. The invention does not limit the operation of the equipment to any particular direction of plasma generation or gas flow.

As shown in FIG. 4, the furnace 5 and motor 7 are attached to a suitable carrier frame 60 pivotable about support 61 so that the assembly may be oriented in any desired position in a vertical plane.

The process is applicable to the production of material other than silica in fine powder form. Typical examples are alumina and titania, which may be produced in fine powder form by the plasma evaporation and subsequent condensation of alumina and titania respectively, fed into the plasma by any of the feed methods already described, i.e. gas entrainment of coarse powder, "toothpaste" injection or rod or pellet feeding. Carbon may be added so that reduction and reoxidation occur, as with silica.

Alumina may be alternatively produced in fine powder form using aluminium metal as the starting material, and converting this to alumina by the heat of the plasma in an oxygen containing atmosphere, the alumina being subsequently condensed into fine powder form.

It is to be understood that the foregoing description of specific examples of this invention is not to be considered as a limitation of its scope.

I claim:
1. An apparatus for the production of a fine powder comprising:
 a substantially cylindrical cluster of spaced metal tubes of high electrical and thermal conductivity for structurally supporting a complementary cylindrical member when placed therein;
 means for rotating said cluster;
 means for passing a coating fluid through said tubes;
 means including an induction coil surrounding a portion of said cluster for energizing a medium frequency or radio frequency plasma within said cluster;
 means for feeding a material containing the constituent elements of said fine powder into said plasma to vaporize said material;
 means for condensing the vaporized material; and
 means for collecting the condensed material.

2. An apparatus according to claim 1 further including means for varying the orientation of the axis of rotation of said cluster in a vertical plane.

3. An apparatus according to claim 1 further including a tube of dielectric material surrounding said cluster.

4. An apparatus according to claim 1 wherein said vaporized material condensing means comprises a cooling chamber having a bell mounted inlet adjacent to the outlet of said cluster for admitting post-plasma cooling gas into the chamber.

5. An apparatus according to claim 4 wherein said cooling chamber includes means for imparting a spiral rotation to the cooling gas in the opposite sense of the direction of rotation of said cluster.

6. The apparatus of claim 1 wherein said cluster comprises a plurality of U-shaped tubes longitudinally arrayed to be substantially cylindrical, and each said U-shaped tube being electrically isolated.

7. The apparatus of claim 1, wherein said constitutent elements are fed into said plasma in the form of a paste containing hydrocarbon elements.

References Cited
UNITED STATES PATENTS

| | | | |
|---|---|---|---|
| Re. 25,858 | 9/1965 | Matvay | 204—323 |
| 2,728,723 | 12/1955 | Akerlof | 204—328 |
| 3,182,176 | 5/1965 | Bunt et al. | 219—75 |
| 3,340,415 | 9/1967 | Ruiter et al. | 219—121 P |
| 3,375,392 | 3/1968 | Brzozowski | 219—75 |
| 3,400,070 | 9/1968 | Naff | 204—323 |
| 3,429,665 | 2/1969 | Evans et al. | 23—294 |
| 3,524,496 | 8/1970 | Barnes | 23—294 |
| 3,533,756 | 10/1970 | Houseman | 23—294 |

FOREIGN PATENTS

| | | | |
|---|---|---|---|
| 277,436 | 3/1965 | Australia | 219—121 P |
| 1,963,089 | 9/1970 | Germany | 204—328 |

NORMAN YUDKOFF, Primary Examiner

R. T. FOSTER, Assistant Examiner

U.S. Cl. X.R.

23—294; 204—328; 219—121 P